(No Model.)  5 Sheets—Sheet 1.

U. H. ODELL.
ROLLER GRINDING MILL.

No. 306,945.  Patented Oct. 21, 1884.

Attest,
Jno. E. Jones
J. A. Rutherford

Inventor,
Udolpho H. Odell,
by Wood & Boyd
his Attorneys &c.

(No Model.)
U. H. ODELL.
ROLLER GRINDING MILL.
No. 306,945. Patented Oct. 21, 1884.
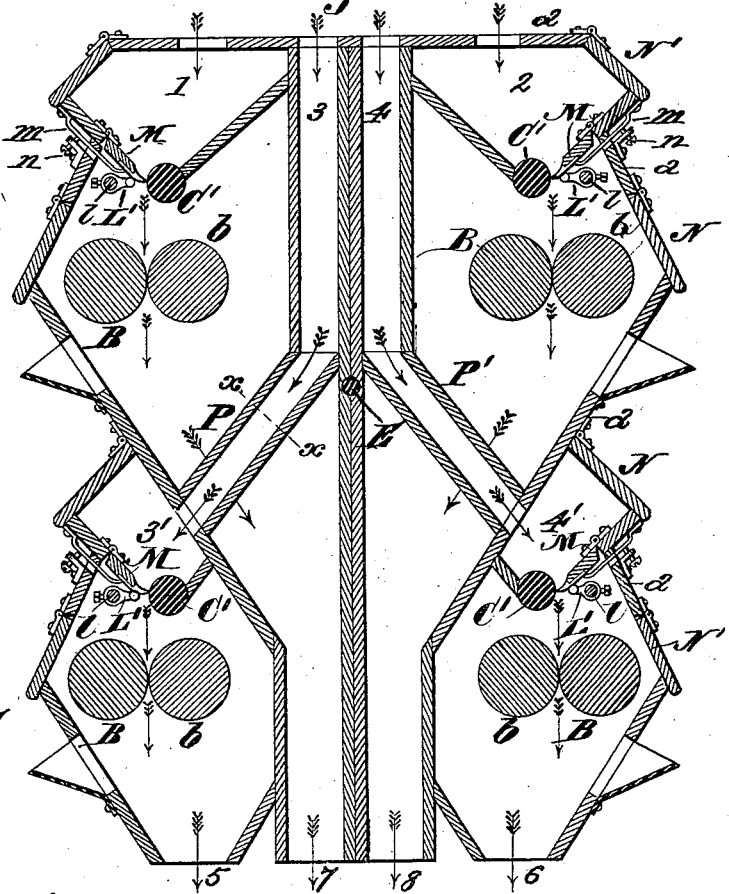
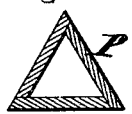
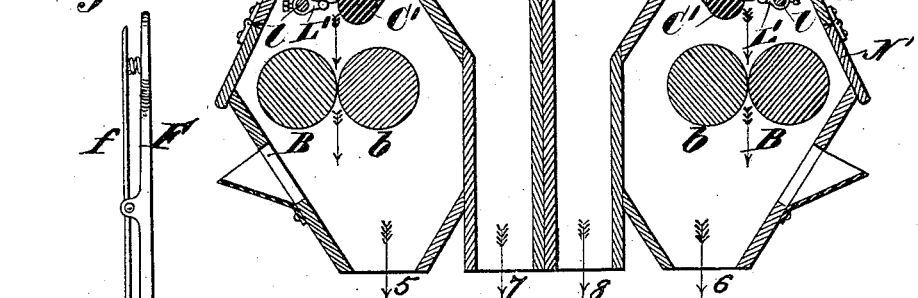
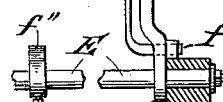
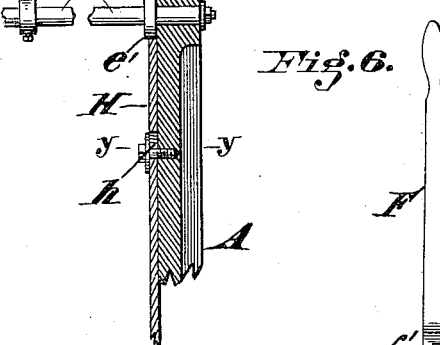
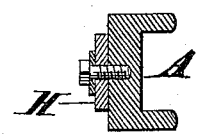
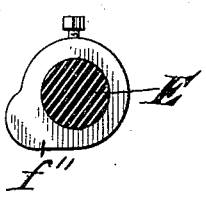
Attest
Jno. E. Jones
J. A. Rutherford
Inventor
Udolpho H. Odell
by Wood Boyd
his attorneys &c.

(No Model.) 5 Sheets—Sheet 3.
U. H. ODELL.
ROLLER GRINDING MILL.
No. 306,945. Patented Oct. 21, 1884.
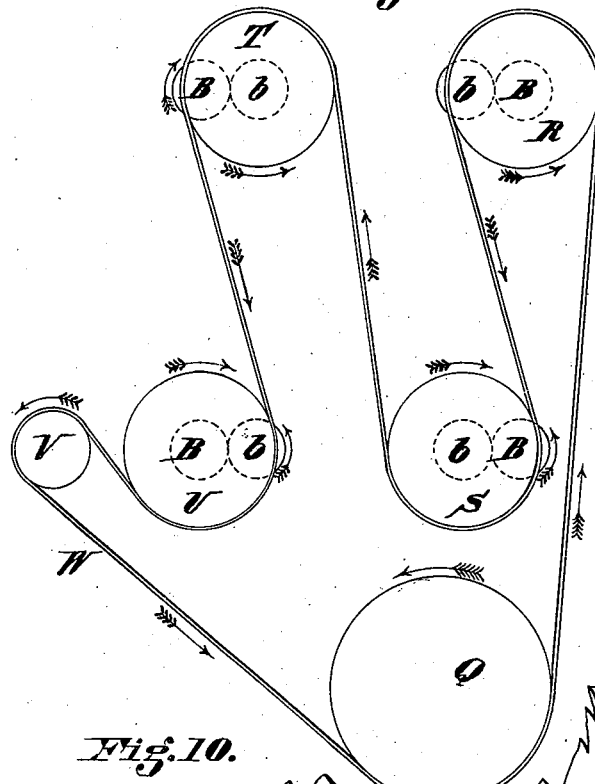
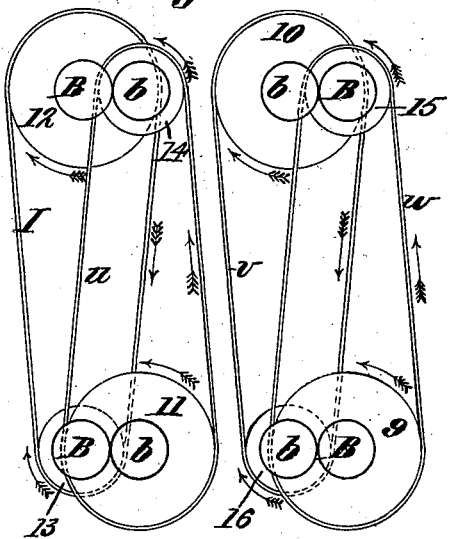
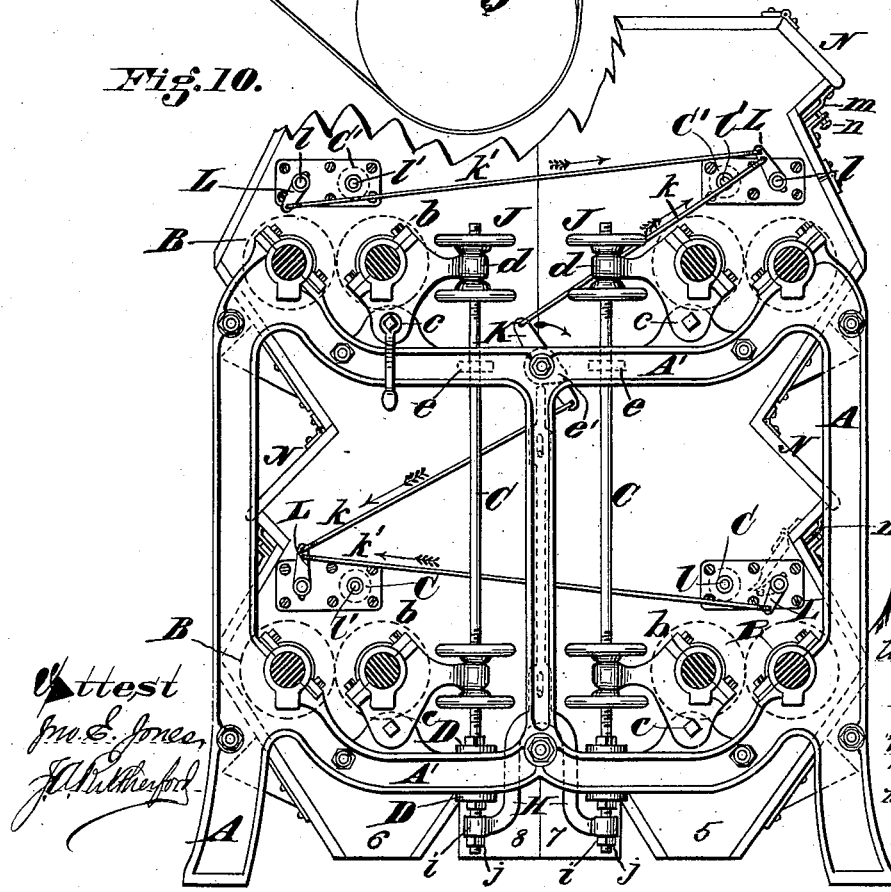

(No Model.) 5 Sheets—Sheet 4.
U. H. ODELL.
ROLLER GRINDING MILL.
No. 306,945. Patented Oct. 21, 1884.
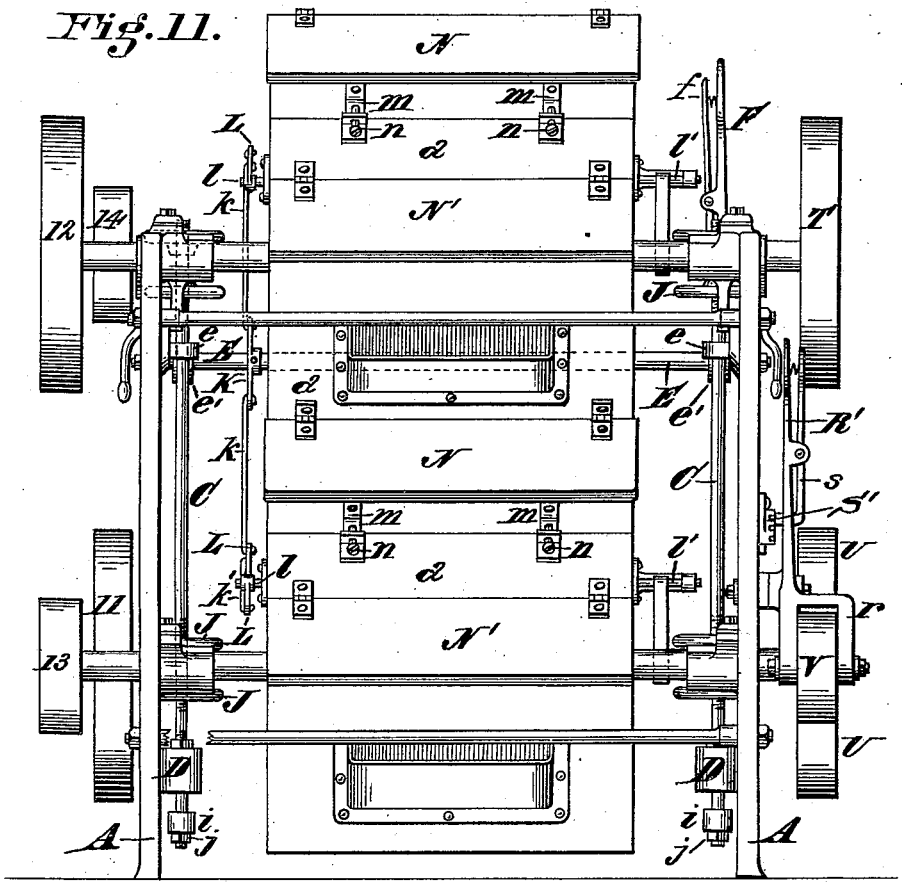
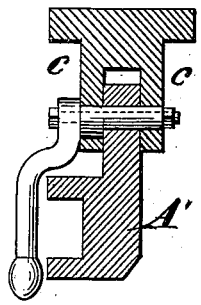
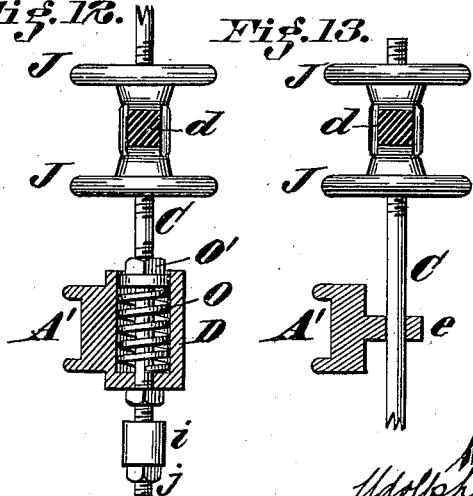
Attest
Jno. E. Jones
J. A. Rutherford
Inventor
Udolpho H. Odell
by Wood & Boyd
his Attorneys (No Model.)

U. H. ODELL.
ROLLER GRINDING MILL.

No. 306,945. Patented Oct. 21, 1884.

Attest
Jno. E. Jones
J. A. Rutherford

Inventor
Udolpho H. Odell
by Wood & Boyd
his Attorneys &c.

UNITED STATES PATENT OFFICE.

UDOLPHO H. ODELL, OF DAYTON, OHIO.

ROLLER GRINDING-MILL.

SPECIFICATION forming part of Letters Patent No. 306,945, dated October 21, 1884.

Application filed September 22, 1883. (No model.)

*To all whom it may concern:*

Be it known that I, UDOLPHO H. ODELL, a citizen of the United States, and a resident of Dayton, in the county of Montgomery and State of Ohio, have invented certain new and useful Improvements in Roller Grinding-Mills, of which the following is a specification.

This invention relates to improvements in roller-mills, and has for its object to provide a novel arrangement and combination of devices whereby the grinding-rolls are arranged in pairs—one pair directly above the other pair—whereby the movable journal-arms of all the rolls can be adjusted and the slow rotating roll of one set can be driven by the fast rotating roll of another set.

The invention has other objects, which will be fully set forth.

The invention will be first specifically set forth in detail, and afterward pointed out in the claims, reference being had to the accompanying drawings, in which—

Figure 1:
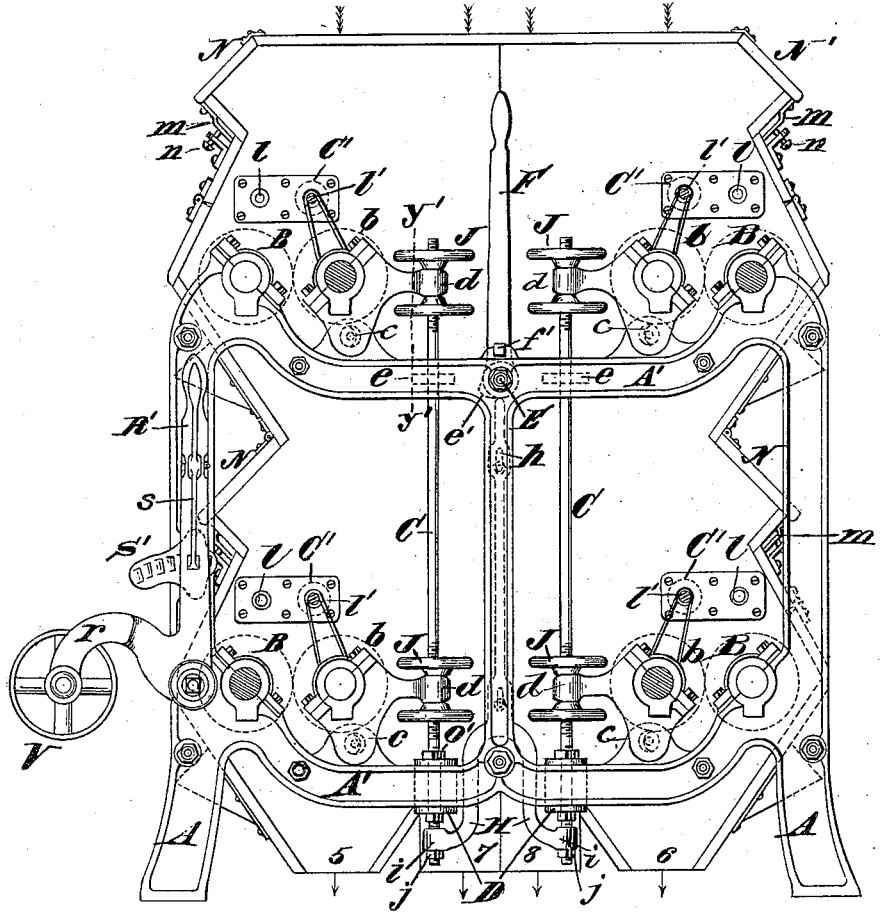
Figure 2:
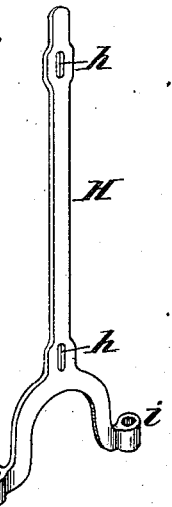
Figure 17:
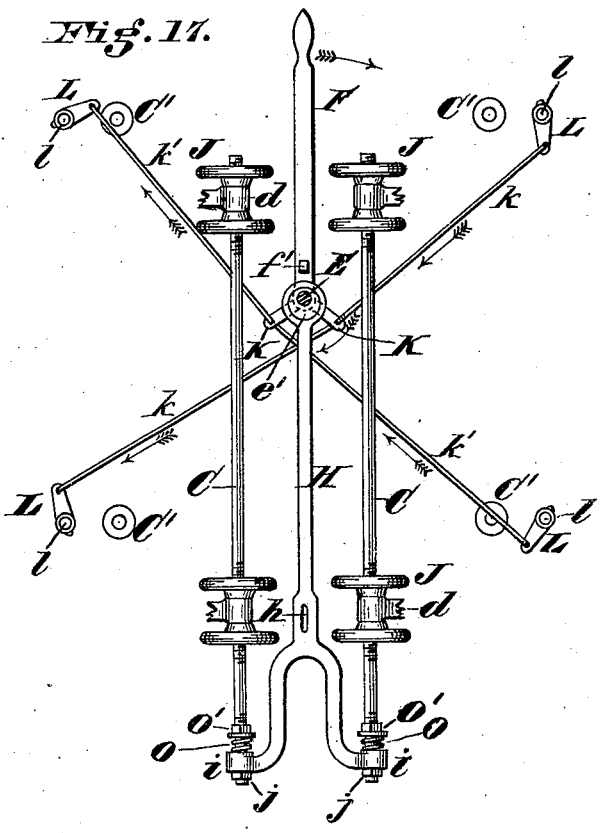

Figure 1 is an elevation of my improved mill with the driving-pulleys removed. Fig. 2 is a perspective view of the connecting-rod for adjusting the rolls. Fig. 3 is a central vertical cross-section taken on the same plane as shown in elevation in Fig. 1. Fig. 4 is a section on line $x$ $x$, Fig. 3. Fig. 5 is an elevation, partly in section, showing the adjusting-lever mounted on the through-shaft. Fig. 6 is a side elevation of the adjusting-lever. Fig. 7 is a section on line $y$ $y$, Fig. 5. Fig. 8 is an elevation of the driving-pulleys on one side of the machine. Fig. 9 is an elevation of the driving-pulleys on the opposite side of the machine from that shown in Figs. 1 and 8. Fig. 10 is an elevation of the opposite side of the improved mill shown in Fig. 1, with the driving-pulleys which are shown in Fig. 9 removed. Fig. 11 is a side elevation of my improved machine. Fig. 12 is a detached sectional view of the spring and the lower end of adjusting-shaft. Fig. 13 is an end elevation of the upper end of the adjusting-rod and hand-wheels on line $y'$ $y'$, Fig. 1. Fig. 14 is a section of the frame-work, showing the mode of pivoting the journal-boxes of the adjustable rolls. Fig. 15 is a plan view of one of the adjustable wheels and arms of the removable rolls. Fig. 16 is a plan view of the cam on the through-shaft for using the adjustable rolls. Fig. 17 is an elevation having a modified means of connecting adjustable rolls and feed cut-off devices.

A A' represent the posts and frame of my improved mill. It is represented in Figs. 1–3 and 10 as adapted to be used with two sets of gang-rolls, the gang-sets upon each side being duplicates one of the other.

B represents the stationary rolls of each of the sets.

$b$ represents the movable rolls. The journal-boxes of the rolls B are rigidly secured to the frame A, and the adjustable rolls $b$ are each pivoted to the frame by ears $c$ on the adjustable arms $d$, which arms are each provided with an elongated opening or eye, $d'$, as shown in Fig. 15. The adjusting arms $d$ of each of the upper sets of rolls are connected by the vertical rods C on each side of the machine to the adjusting-arms $d$ vertically underneath them, the rods passing through the eyes $d'$ of the adjusting-arms $d$. These rods are held in vertical position by bearings $e$ on the upper part of the frame of the machine, and by similar bearings in the spring-housings D at the bottom, so as to allow vertical movement of the rods C. The adjustable rolls $b$ are arranged upon each side of the machine in the same manner.

E represents a through-shaft, which passes from side to side through the frame of the machine, and is suitably journaled thereto.

F represents a lever, which is keyed upon the said shaft E. It is provided with a spring-latch and lock, $f$ $f'$, for locking it in position. On the lower end of lever F is placed a cam, $e'$, the face of which engages with the bifurcated lever H, which is provided with slots $h$, through which pass pins to hold it vertically.

$i$ represents sleeves upon the lower ends of the forks of the bifurcated lever H, through which pass the vertical rods C, which are secured thereto by means of nuts $j$, these parts being duplicated on each side of the machine.

$f''$ represents a cam on the through-shaft E, keyed upon the end opposite to that upon which lever F is keyed. By turning the lever F and rotating the shaft E cams $f''$ and $e'$ press down the bifurcated levers H, the forks of which are secured to the rods C, moving them vertically downward, and thereby moving the adjustable rolls *b* upon their pivots, thus spreading the rolls apart and stopping their grinding. A reverse movement of the lever F sets the rolls *b* up to rolls B, ready for grinding.

J represents hand-wheel nuts, tapped upon the rods C, which are screw-threaded to reverse them, so that the journal arms *d* on rolls *b* may be adjusted on the rods C to regulate the distance between rolls B and *b*.

K represents crank-arms keyed upon through-shaft F, and *k k'* links connecting crank-arms K with the crank-arms L, which are journaled to the frame of the machine at or near the hoppers 1 and 2.

M represents hopper-gates, hinged to the hoppers, as shown in Fig. 3.

*m* represents adjustable springs, and *n* adjusting-screws, against which springs *m* the gates respectively rest when open. The lower ends of these springs press a gate against its feeding-rolls C'. The hopper-gates are opened and closed by means of shafts *l* and cranks L L', which are operated by the through-shaft E, cranks K, and links *k k'*, which connect the crank-arms K with the shafts *l* of the hopper-gates and open or close the gates as the crank K is moved by the lever F and connecting mechanism.

*l'* represents the shafts of feed-rolls C'. It will thus be seen that the several hopper-gates will be simultaneously opened and closed with the adjusting of the rolls by a single movement of the lever F. It is also obvious that the gang sets of rolls can be used in multiples of two.

I have shown two different means of employing a spring upon vertical rods C for allowing the adjustable rollers *b* to yield to undue strain, as when a stone or other solid substance passes between the rolls.

D represents a housing attached to the frame, as shown in Figs. 10 and 12.

O is a spring coiled around rod C, the tension of which is adjusted by means of a nut, O', which screws upon rod C. Instead of attaching the spring-housing to the frame A', as shown in Fig. 12, the springs may be placed on rods C below the frame between the sleeves on bifurcated arms *i* and the adjusting-nuts O', as shown in Fig. 17. This plan of employing the springs has one advantage over the form shown in Fig. 1, in that the adjusting-roller arms *d* by the movement of lever F do not act upon the tension of the springs, but directly upon the nuts O', whereas in the plan shown in Figs. 1 and 12 the opening of the rolls is effected by moving the rods C against the tension of the springs.

1 2 3 4 represent the hoppers and feed-spouts for feeding the grist separately to each pair of grinding-rolls.

P P' represent spouts leading to hoppers 3' and 4', which spouts are made of triangular shape, as shown in Fig. 4, so as to allow the charge ground by the two top pairs of rolls to pass freely over the spouts P and P' and to be discharged out of their respective spouts, 7 and 8, as shown in Fig. 3. It will be thus seen that each of these sets of rolls grinds its own charge independently of the other set in the same or adjacent gangs. Each feeding-hopper and its delivery-spout is independent of and has no communication with any of the other hoppers and delivery-spouts, so that separate and distinct grains or grain products can be delivered to each pair of rolls and discharged after being acted on by such rolls. In order to drive one of each of these different sets of rolls at the same speed, I employ a single belt, as shown in Fig. 8, to drive, say, the fast roll of each of the sets.

Q represents the main driving-pulley, which is keyed upon the driving-shaft, preferably hung under the mill.

R S T U represent pulleys keyed upon the shafts of the fast rolls of each of the sets.

V represents a tightener-pulley, which is journaled upon the pivot of crank-arm *r*, which in turn is pivoted to the frame of the machine, and is adjusted by means of a hand-lever, R'.

S' represents rack-teeth, into which the latch *s* engages. By moving the lever R' and raising the pulley V, journaled upon the arm *r* upward, belt W is tightened and pulleys R S T U driven by the pulley Q. By lowering the pulley V belt W is loosened sufficiently to allow it to pass over the pulleys without driving the rolls to which they are keyed.

9 10 11 12 represent pulleys keyed upon the shafts of the slow-speeded rolls on the opposite end of the machine from that shown in Fig. 8.

Figs. 13, 14, 15, and 16 represent pulleys keyed upon the shafts of the fast-speeded rolls on the opposite end of the machine from that shown in Fig. 8.

I represents a belt passing over pulleys 12 and 13.

*u* represents a belt passing over pulleys 11 and 14.

*v* represents a belt passing over pulleys 10 and 16; *w*, a belt passing over pulleys 9 and 15. Each pulley 13, 14, 15, or 16 is a driver for the slow-speeded roll of the set either above or below it, as the case may be, each being a transmitter of a uniform speed, as the fast rolls are all driven by single belt W, as shown in Fig. 8.

It is obvious that the terms "fast" and "slow" speeded rolls are used for convenience of description, as the relative speed of the rolls may be modified by changing the size of the pulleys. Thus both rolls of a set may be driven at uniform speed; but one of the rolls will have two pulleys on its shaft, so as to transmit power to the grinding-roller of another set vertically above or below it; or the pulleys might be reversed and the slow-speeded rolls used as drivers by simply transposing the positions of the small and large pulleys.

It is highly advantageous to employ belts for the driving grinding-rolls, and by employing rolls in gang-sets, one pair vertically above the other, one roll of each set may be used to drive one of the rolls of the set either above or below it, as they are a sufficient distance apart to allow belts to be used.

When the belts are used vertically, as shown in Fig. 9, the belts have a motion sufficient to allow the rolls to be adjusted without being unduly affected by the strain of the belts. By this plan of arranging the driving-pulleys and the grinding-rolls upon the frame of the machine the speed of all the sets used on the frame is made uniform, and is increased and decreased at pleasure by varying the speed of the main driving-pulley Q; and this is a very great advantage in the arrangement of gang-sets of grinding-rolls, and all of the sets of rolls can be stopped or started by the movement of the single lever and its connecting parts. This stopping and starting of the mill can be effected by means of adjusting the tightener-pulley V through lever R', which stops or starts the rolls without cutting off the feed, or by means of lever F the feed is cut off and the rolls thrown apart while running without detriment to the rolls.

I do not desire to limit myself to the special means shown for simultaneously adjusting the grinding-rolls or the connecting mechanism for opening or closing the gates simultaneously therewith, for this adjusting and connecting mechanism may be variously modified without departing from the principal features of my invention. The hopper-gate mechanism may be also variously modified without affecting the operation of the mill when used in gang sets, as herein provided.

It is obvious that two sets of grinding-rolls, one vertically above the other, instead of four sets, as herein shown, may be employed and obtain many advantages herein specified, and when used and constructed in the manner herein shown contain several features of my invention. More than four sets—as six or eight—might be employed on the frame without departing from the principle of invention herein set forth.

N N' represent hinged lids attached to the boxing a, which lids are adapted to be raised to allow easy access to the grinding and feeding rolls.

I claim—

1. The combination of the supporting-frame, a series of pairs of grinding-rolls, one pair placed directly above the other, movable journal arms for one of the rolls of each pair, a series of independent non-communicating feeding-hoppers and delivery-spouts, one for each pair of rolls, and vertically-arranged rods connecting the movable journal-arms of all the rolls for simultaneously adjusting the same, substantially as described.

2. In combination with the frame of a grinding-mill, two sets of grinding-rolls, the shaft of one roll in each set being provided with a pulley upon each end, one adapted to be employed as a driven pulley and the other as a driving-pulley for transmitting power to one of the rolls of the other set in the gang, substantially as herein set forth.

3. The combination of a supporting-frame, a series of pairs of grinding-rolls, one pair placed directly above the other pair, movable journal-arms for one of the rolls of each pair, an independent non-communicating hopper and delivery-spout for each pair of rolls, a single hand-lever, and vertical rods connecting the single hand-lever with all the movable journal-arms for simultaneously adjusting the same, substantially as described.

4. The combination of a supporting-frame, a series of pairs of grinding-rolls, one pair placed directly above the other pair, movable journal-arms for one of the rolls of each pair, an independent non-communicating hopper and delivery-spout for each pair of rolls, a hopper-gate for each hopper, a through-shaft, a single hand-lever on said shaft, and rods connecting the single lever with the movable journal-arms of all the rolls and the hopper-gates of all the hoppers for simultaneously adjusting the journal-arms and gates, substantially as described.

5. In a roller-mill, the combination of the supporting-frame, a series of pairs of grinding-rolls, one pair placed directly above the other pair, a driving-pulley fixed on each end of one of the shafts of each pair of rolls, a tightener-pulley on the supporting-frame, and a single belt passing around the said pulleys, substantially as described.

6. In a roller-mill, the combination of the supporting-frame, the four pairs of grinding-rolls, two pairs being placed one directly above the other, the movable journal-arms d, the vertical connecting-rods C C, the bifurcated connecting rods H, a through-shaft, E, and a single hand-lever, F, for simultaneously adjusting the journal-arms, substantially as described.

7. The combination of the supporting-frame, the through-shaft E, the lever F, the pairs of movable grinding-rolls connected with the lever, the hopper-gates, the crank-arms K, the connecting-links k k, and the cranks L, for simultaneously adjusting the hopper-gates, substantially as described.

8. The combination of the supporting-frame, the vertical adjusting-rods C C, the journal-arms d, the bifurcated rods H, the through-shaft E, and the cams thereon for simultaneously moving the adjusting-rods, substantially as described.

9. The combination of the supporting-frame, the series of pairs of grinding-rolls arranged one pair directly above the other pair, the vertical rods C, connected with one roll of each pair, the springs O, supported in vertical positions and coiled on the rods, the hand-lever F, and the bifurcated lever H, having its bifurcations connected with the rods, substantially as described.

10. The combination of the hoppers, the hinged gates M. the springs $m$. the screws for adjusting the springs, the crank-arms K, the connecting-links $k\ k'$, and the cranks L, for opening and closing the gates, substantially as described.

11. In combination with vertical rods C and journal-arms $d$, the two movable sets of rolls, the springs O being coiled around the rods C, which sets are adapted to yield to undue strains of either of the rolls, substantially as herein set forth.

12. In combination with the hinged hopper-gates M. the adjusting-spring $m$ and screw $n$, substantially as specified.

In testimony whereof I have hereunto set my hand.

UDOLPHO H. ODELL.

Witnesses:
  E. E. WOOD,
  JNO. E. JONES.